United States Patent [19]
Carlson et al.

[11] Patent Number: 5,506,480
[45] Date of Patent: Apr. 9, 1996

[54] PAIRED DIMMERS FOR CONTROLLING HARMONIC CURRENTS

[75] Inventors: Steven B. Carlson; Gordon Pearlman, both of Portland, Oreg.

[73] Assignee: Entertainment Technology, Inc., Portland, Oreg.

[21] Appl. No.: 150,491

[22] Filed: Nov. 12, 1993

[51] Int. Cl.$^6$ ........................................................ G05F 1/00
[52] U.S. Cl. ................................ 315/292; 315/308:DIG. 4
[58] Field of Search ............................. 315/DIG. 4, 308, 315/291, 292

[56] References Cited

U.S. PATENT DOCUMENTS

| | | |
|---|---|---|
| 4,688,154 | 8/1987 | Nilssen ................................ 315/312 |
| 5,004,969 | 4/1991 | Schanin . |
| 5,239,255 | 8/1993 | Schanin et al. . |

OTHER PUBLICATIONS

"The ET Dimmer Test," John Huntington, *Lighting Dimensions*, Oct., 1991.
"The Impact of Degrading Energy Quality," Sam Johnson, *LD&A*, Jun. 1991.
"Nonlinear Loads Mean Trouble," Arthur Freund, *EC & M*, Mar. 1988.

*Primary Examiner*—Robert J. Pascal
*Assistant Examiner*—Reginald A. Ratliff
*Attorney, Agent, or Firm*—Chernoff, Vilhauer, McClung & Stenzel

[57] ABSTRACT

A control system for a plurality of switched loads includes an AC line and a neutral wire and a pair of loads coupled in parallel between the AC line and the neutral. The switched loads may be operated so that one load in the pair operates in forward phase control mode and the other load in the pair operates in reverse phase control mode. This reduces harmonic current in the neutral wire otherwise resulting from odd order harmonics generated by the switching of AC current into the load during normal operation.

9 Claims, 3 Drawing Sheets

PAIRED DIMMERS FOR CONTROLLING HARMONIC CURRENTS

BACKGROUND OF THE PRESENT INVENTION

Electric lighting circuits of the type used in theater rely heavily on dimmer circuits which present a nonlinear electrical load to the AC line. Typically dimmers use thyristors for controlling the switching of current into a lighting load. A typical thyristor-controlled lighting load is shown in Pearlman et al. U.S. Pat. No. 4,649,323. Using a technique called forward phase control, a firing signal is sent to a thyristor at some predetermined phase angle after the zero crossing of the AC current which turns on the current to the load. The phase control of this type, when using thyristors and other switched loads, presents problems for reactive components such as motor drives coupled to the load and associated circuitry. One major effect of nonlinearities in the load is the creation of harmonic currents which have frequencies that are multiples of the line frequency. Harmonic currents which are odd multiples of the AC line frequency may cause excessive heating in the magnetic steel cores of transformers and neutral wires. These especially troublesome odd order harmonics tend to be additive in the neutral conductors of the system. This overloads the neutral conductors and causes excessive heating.

In an ideal three phase, four wire system with no harmonic currents, single phase line-to-neutral load currents flow in each phase conductor and return in the common neutral conductor. This would represent the base line neutral current. If the three 60 cycle phase currents are separated by 120° for a balanced three phase load the currents should be equal. When the return currents flow in the neutral wire, there should be cancellation, making the net current zero at all points.

In a system with phase controlled loads, however, the return currents include these third harmonic currents. The sum of the total of the three phases at the third harmonic is, however, the arithmetic sum of the individual third harmonic phase currents. This is also true for other odd multiples of the third harmonic. The theoretical maximum neutral current with harmonics is at least 1.73 and perhaps as much as three times the phase current. This is dependent to a degree on the type of load but for phase control lighting loads it is about 1.37 times the phase current. As pointed out above, this unwanted current in the neutral wire can cause over-heating and can effect the power factor. The effect on the service transformer is that load currents which are substantially high in harmonic content can cause more heating than an undistorted current. This is due to the fact that heating is related to the square of the frequency of the current. Thus, a third order harmonic will have nine times the heating effect of the line current. Any current losses also increase as a function of frequency. In such situations transformers which have been loaded to only 70% of their rated load have been shut down due to over-temperature conditions. Also, the service transformer for an entertainment lighting system is subjected to enormous stresses due to cold lamp in-rush currents which may be 15 to 20 times the normal rated lamp current. In-rush currents coupled with third order harmonics can drastically reduce the service life of these transformers.

What is needed, therefore, is a method for reducing the level of odd harmonic currents in the neutral line to reduce heating and transformer stress.

It has been discovered that odd order harmonics produced by a dimmer operating in forward phase control are out of phase with the odd order harmonics produced by a dimmer operating in reverse phase control. Recently, circuits have been developed for dimmers of the stage lighting type that operate in reverse phase control. Dimmer control circuits of this type are shown in Schanin et al. U.S. Pat. Nos. 5,239,255 and 5,004,969, the disclosures of which are hereby incorporated herein by reference. In addition, the Schanin et al. U.S. Pat. No. 5,239,255 includes the capability for operating in either reverse phase control (RPC) mode or forward phase control (FPC) mode.

SUMMARY OF THE INVENTION

Accordingly, a control system constructed according to the invention includes at least one pair of switched load devices coupled in parallel between an AC line and a neutral wire wherein one of the devices is operated in a forward phase control mode and the other of the devices is operated in a reverse phase control mode. There may be a bank of such devices containing an even number thereof such that the devices may be paired, with one device in each pair operating in forward phase control and the other device operating in reverse phase control. Each switched load device pair is driven by the same phase of the AC signal which may be a conventional three phase system.

In a stage lighting system, control means such as a console may be provided for coupling associated selected devices, called dimmers, in FPC and RPC pairs. The FPC and RPC dimmer pairs operate most efficiently when there is 100% overlap in the duty cycles of each respective dimmer. For example, if a dimmer connected to the phase A line of a three phase AC signal operates at a 70% duty cycle in forward phase control, the best "match" for that dimmer would be one also connected to phase A operating in reverse phase control at a 30% duty cycle. When this is the case, any odd harmonic currents generated by the nonlinear nature of the load will tend to cancel out in the neutral wire.

Although it is preferable to "pair up" dimmers according to the overlap in duty cycles, a significant reduction in the odd harmonic neutral wire current may still be achieved where a large number of dimmer pairs are involved because of the statistical distribution of duty cycles among the forward phase control mode dimmers and the reverse phase control mode dimmer in each pair. However, if desired, a computer may be provided for matching dimmer pairs according to duty cycle and phase control mode.

As such the stage control lighting system of the invention includes a plurality of dimmers where each dimmer is associated with a predetermined dimmer channel. A mode control selector is provided for assigning either a forward phase control mode or a reverse phase control mode to each dimmer channel and includes a selector for pairing selected dimmer channels into complimentary dimmer pairs coupled in parallel between the line and neutral wire operating on the same phase of the AC line where one dimmer channel operates in forward phase control mode and the other dimmer channel operates in reverse phase control mode.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
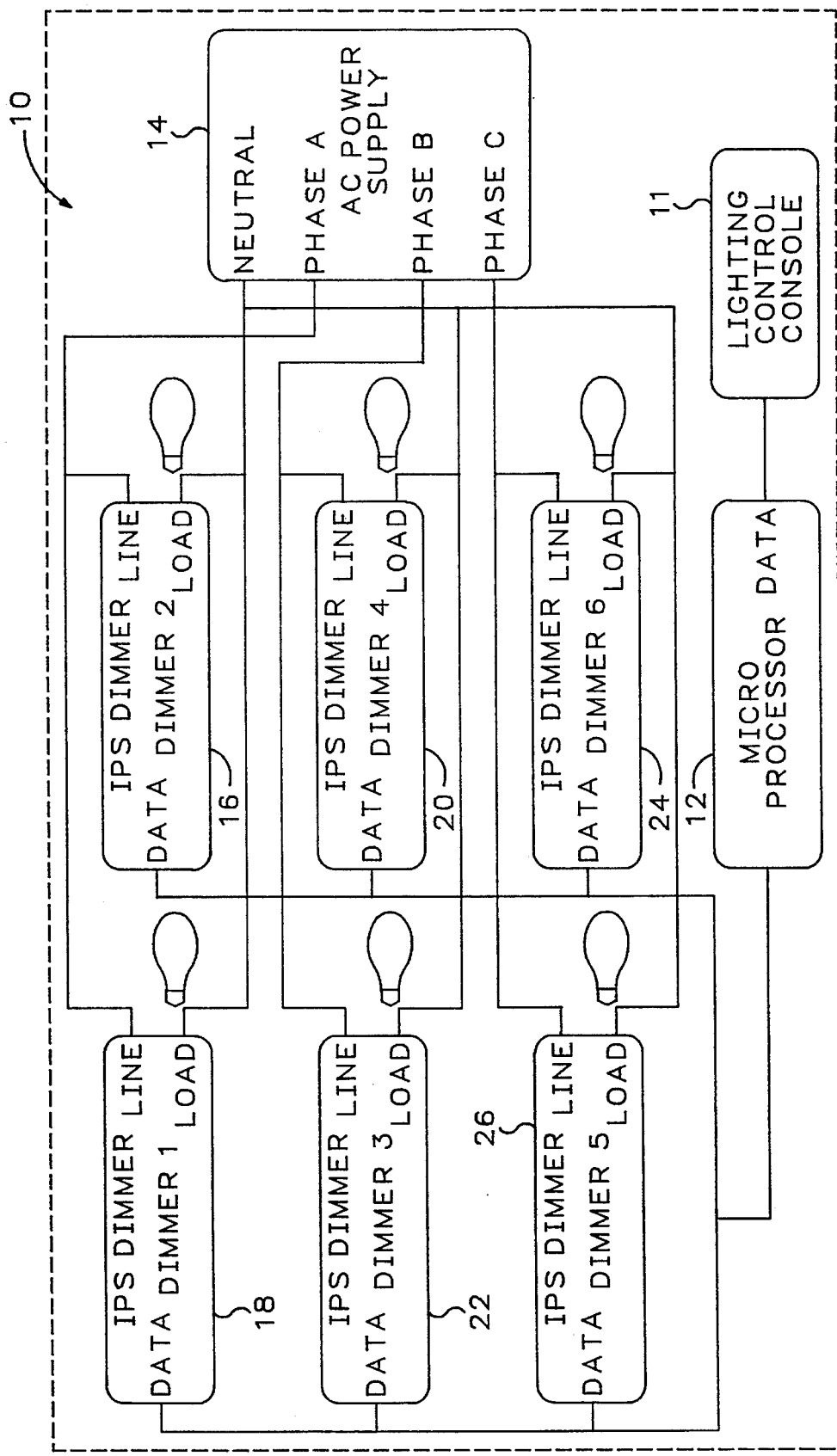
FIG. 1 is a block schematic diagram of a six dimmer stage lighting unit operating on a three-phase power distribution system.

Referring to FIG. 1 a lighting control system 10 includes a microprocessor 12 connected to dimmer pairs which are wired in parallel. A standard three-phase AC power supply 14 includes lines for neutral, phase A, phase B and phase C. Phase A is coupled to a dimmer pair consisting of dimmers 16 and 18. Phase B is coupled to a dimmer pair consisting of dimmers 20 and 22 and phase C is connected to a dimmer pair consisting of dimmers 24 and 26. Each of the dimmers includes a DATA input line from the microprocessor 12, a line input from one of the phases of the power supply 14 and a load output coupled to the neutral line. Each of the dimmers is constructed along the lines of the devices shown in Schanin, et al., U.S. Pat. Nos. 5,239,255 and 5,004,969. As such, each dimmer is capable of operating in either forward phase control (FPC) or reverse phase control (RPC) mode.

The system represented in FIG. 1 is a dimmer bank consisting of six dimmers. Each phase of the AC power supply is coupled to two dimmers in parallel. Thus dimmers 26 and 24 are paired together, as are dimmers 22 and 20, and dimmer 18 with 16. In order to operate in a low harmonic current mode, each dimmer pair should consist of one dimmer operated in FPC and the other dimmer of the pair operated in RPC. Pairing the dimmers per phase within the unit is done strictly for convenience because it is unknown whether at any given time the duty cycles of the paired dimmers will be such that their combined duty cycle adds up to 100%, which is the optimum case. Still, statistically at least, pairing the dimmers within a unit will, over time, serve to reduce the harmonic currents in the neutral wire.

In order to set up the system 10 in this way the lighting control console 11 sends a signal to the microprocessor 12 instructing it that the dimmers are to operate in a low harmonic current mode. This selection could also be made locally at a dimmer unit's head end processor. The processor 12 then sets the dimmer pairs 24–26, 20–22 and 16–18 so that one dimmer in each pair is operated in FPC mode and the other dimmer is operated in RPC mode.

Figure 2:
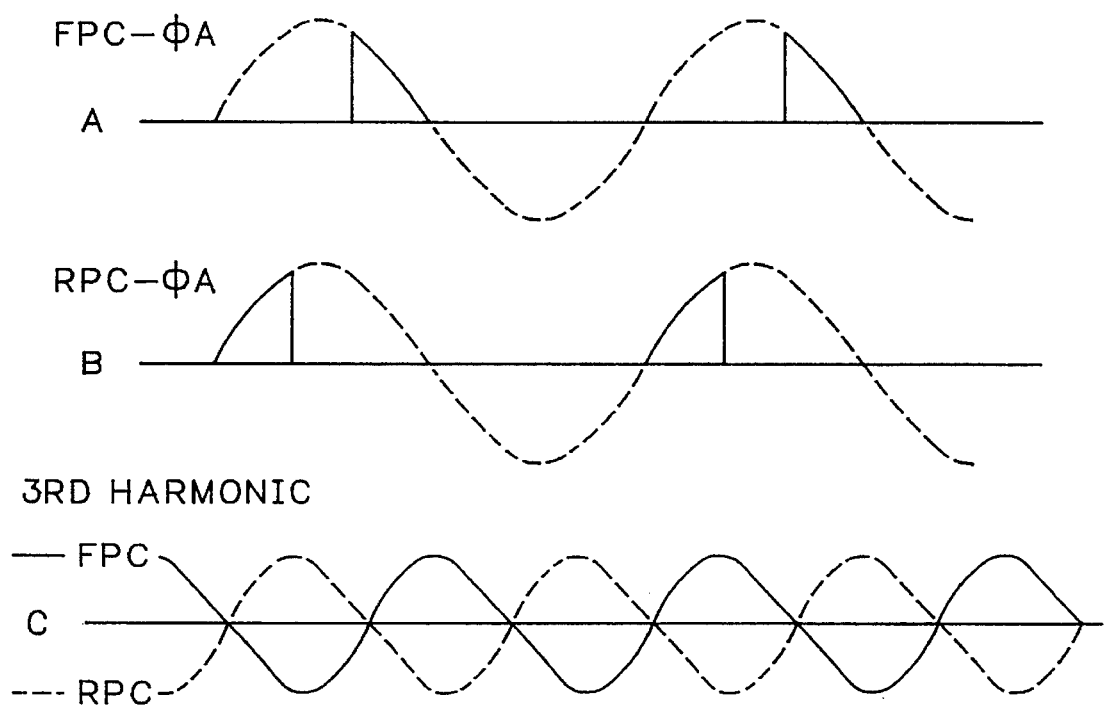
FIG. 2 is a wave form diagram showing a single phase power wave form operated in both forward and reverse phase control and the resulting third order harmonics.

The effect of this operation is shown in FIG. 2. Dimmers 16 and 18 are coupled to phase A of the AC power supply 14. The top wave form of FIG. 2 shows dimmer 16 operated in FPC mode and dimmer 18, which is the second wave form in FIG. 2, is operated in RPC mode. The duty cycles are shown as being about the same. This is for convenience of illustration since normally the duty cycles set at the lighting control console 11 may differ widely for each dimmer pair. The bottom waveform shows the effect of the FPC/RPC pairing. The solid line represents the third harmonic that is produced by the dimmer operating in FPC mode. The dashed line represents the harmonic generated by the dimmer operating in RPC mode. These waveforms represent currents flowing in the neutral wire. Since the harmonics are 180° out of phase with respect to each other they tend to cancel in the neutral wire. Even in cases where the duty cycles do not add up to 100% there will at least be partial cancellation in the neutral wire and the absolute value of the harmonic current will be reduced by the FPC/RPC pairing.

Figure 3:
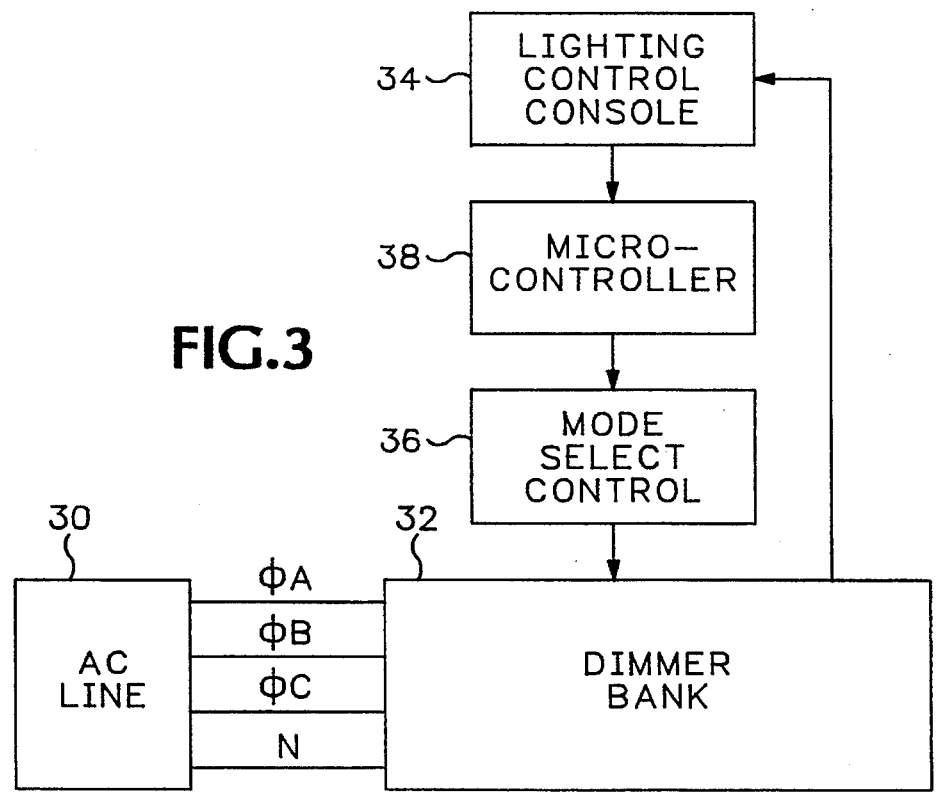
FIG. 3 is a block schematic diagram of a bank of dimmers operating on a three phase AC line according to the principles of the invention.

A more generalized system is shown in FIG. 3. An AC power supply 30 is connected to a dimmer bank 32 which may comprise any number of dimmers but there should be an even number of such devices. The dimmer bank 32 is controlled by a lighting control console 34 which is coupled in turn to a microcontroller 38. A mode selection control 36 is driven by the microcontroller 38 which in turn is coupled to the dimmer bank 32. As will be explained below, the system shown in FIG. 3 attempts to match up dimmer pairs whose duty cycles are the closest to producing a 100% duty cycle (i.e., a 70% duty cycle dimmer should be paired with a 30% duty cycle dimmer). The system by which this is accomplished is shown in FIG. 4.

Figure 4:
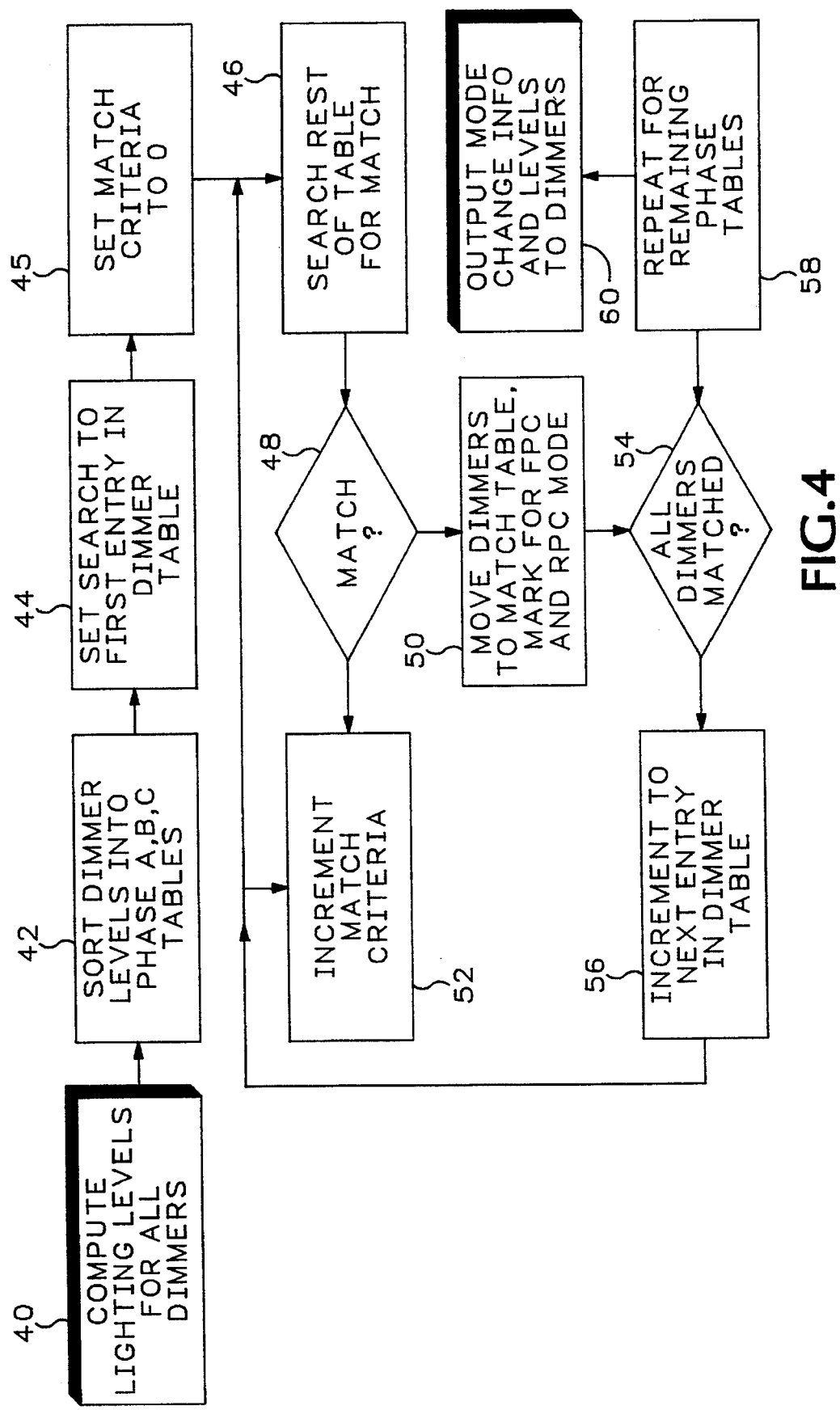
FIG. 4 is a block schematic flow chart diagram illustrating the method of operation of the system of FIG. 3.

Referring to FIG. 4, software resident in the microcontroller 38 computer lighting levels for all dimmers at block 40. These levels are set by the lighting control console 34 In block 42 these dimmer levels are sorted by phase into A, B and C phase tables. Next, the microcontroller sets a search function for the first entry in the dimmer table at block 44. At block 45 a match criteria value is set to zero. When the match criteria is set to zero, only exact matches are used, that is, matches that produce dimmer pairs whose duty cycles add up to 100%. Next the microcontroller at block 46 searches the rest of the table for a match. In block 48, which is a decision node, the system asks whether or not the search has yielded a match. If the answer is YES the dimmers are moved to a match table in memory and marked for FPC and RPC mode respectively (block 50). If the answer at the decision node is NO the match criteria are incremented (block 52). When the match criteria are incremented, the next search will be for match levels that do not add up to 100% but for those which add up to 99% or 101%. This amounts to finding dimmers which meet the "next best" match. This process will repeat itself until the best matches for dimmer pairs have been made for match criteria that falls within a predetermined range. The decision node at block 54 and the increment command at block 56 are used to move to the next entry in the dimmer table. Thus, for half of the dimmers the "best match" is found until all dimmers have been matched up. At block 58 the system repeats this process for the other phase tables which contain an equal number of dimmers. Once all of the mode control information has been stored in memory in the microcontroller 38 it is outputted to the mode selection control 36 which in turn selects the appropriate phase control (RPC or FPC) for each of the dimmers in the dimmer bank 32.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A stage lighting control system comprising:
   (a) a plurality of dimmers wherein each dimmer in said plurality is associated with a predetermined dimmer channel;
   (b) each dimmer including phase control means for causing said dimmer to operate in either a forward phase control mode or a reverse phase control mode;

(c) mode control selector means for pairing selected dimmer channels into complimentary dimmer pairs wherein one dimmer in each pair operates in forward phase control mode and the other dimmer in the pair operates in reverse phase control mode.

2. The stage lighting control system of claim 1 wherein said selector means comprises computer means for matching the duty cycles of said dimmers to create dimmer pairs whose combined duty cycles approach 100%.

3. A control system for a plurality of switched loads powered by a three phase AC power supply comprising at least one pair of switched load devices for each phase of said power supply coupled in parallel between one phase of said power supply and a neutral wire wherein one of said devices is operated in a forward phase control mode and the other of said devices is operated in a reverse phase control mode.

4. The control system of claim 3 wherein said switched loads are dimmers in a stage lighting system.

5. The control system of claim 1 wherein said switched loads are loads in a three-phase power system.

6. The control system of claim 5, further including a computer for determining the duty cycles of switched loads operating on each phase of the three-phase power system and for creating switched load pairs of devices in each respective phase whose combined duty cycles approach 100%.

7. A multiphase stage lighting system comprising a multiphase power supply and a plurality of pairs of dimmers, each pair of dimmers being respectively coupled to a phase of said power supply, and a mode select control for operating one dimmer in each pair in a forward phase control mode and the other dimmer in each pair in a reverse phase control mode.

8. The multiphase stage lighting system of claim 7 wherein the multiphase power supply is a three phase power supply.

9. The multiphase stage lighting system of claim 8 further including a computer for determining the duty cycles of dimmers operating on each phase of the three phase power supply and for creating selected pairs of said dimmers in each respective phase whose combined duty cycles approach 100%.

* * * * *